United States Patent [19]

Torre

[11] Patent Number: 5,684,120
[45] Date of Patent: Nov. 4, 1997

[54] COLORLESS, TRANSPARENT COPOLYAMIDES, THEIR PREPARATION, AND MOLDED ARTICLES MADE FROM THESE COPOLYAMIDES, THEIR BLENDS OR ALLOYS

[75] Inventor: Phil Hans Dallas Torre, Domat/Ems, Switzerland

[73] Assignee: EMS-Inventa AG, Zurich, Switzerland

[21] Appl. No.: 555,444

[22] Filed: Nov. 9, 1995

[30] Foreign Application Priority Data

Feb. 1, 1995 [CH] Switzerland ............... 00271/95
Sep. 19, 1995 [EP] European Pat. Off. ....... 95114698

[51] Int. Cl.[6] .................... C08G 69/26; C08G 69/28; C08L 77/00
[52] U.S. Cl. ................ 528/346; 528/310; 528/324; 528/329.1; 528/338; 528/339; 528/340; 528/347; 528/349; 525/432
[58] Field of Search ................... 528/324, 346, 528/310, 329.1, 338, 339, 340, 347, 349; 525/432

[56] References Cited

U.S. PATENT DOCUMENTS

| | | | |
|---|---|---|---|
| 3,597,400 | 8/1971 | Kashiro et al. | 528/331 |
| 3,703,595 | 11/1972 | Falkenstein et al. | 528/324 |
| 3,794,625 | 2/1974 | Anderson | 528/324 |
| 4,071,506 | 1/1978 | Brinkmann et al. | 528/324 |
| 4,232,145 | 11/1980 | Schmid et al. | 528/324 |
| 4,268,661 | 5/1981 | Schmid et al. | 528/324 |
| 4,345,066 | 8/1982 | Rüter | 528/324 |
| 4,398,012 | 8/1983 | Merrill et al. | 528/324 |
| 4,731,421 | 3/1988 | Hoppe et al. | 528/324 |
| 4,826,955 | 5/1989 | Akkapeddi et al. | 528/324 |
| 4,847,356 | 7/1989 | Hoppe et al. | 528/324 |
| 4,898,896 | 2/1990 | Maj et al. | 528/323 |
| 5,081,222 | 1/1992 | Reimann et al. | 528/324 |
| 5,310,860 | 5/1994 | Maj et al. | 528/329.1 |
| 5,359,013 | 10/1994 | Mason et al. | 525/432 |
| 5,391,640 | 2/1995 | Akkapeddi et al. | 528/324 |

FOREIGN PATENT DOCUMENTS

| | | |
|---|---|---|
| 0053876 | 6/1982 | European Pat. Off. . |
| 0 313 436 A1 | 4/1989 | European Pat. Off. . |
| 0 553 581 A2 | 12/1991 | European Pat. Off. . |
| 0 550 308 A1 | 7/1993 | European Pat. Off. . |
| 26 42 244 A1 | 9/1976 | Germany . |

Primary Examiner—James J. Seidleck
Assistant Examiner—P. Hampton-Hightower
Attorney, Agent, or Firm—Browdy and Neimark

[57] ABSTRACT

Colorless, transparent copolyamides, made up of monomers based on cycloaliphatic diamines and aromatic dicarboxylic acids and a maximum of 20 mol % of further polyamide-forming aliphatic monomers, which have glass transition temperatures of at least 175° C., their blends and alloys, along with the molded articles that can be produced from them and a process for their preparation are proposed.

21 Claims, No Drawings

COLORLESS, TRANSPARENT COPOLYAMIDES, THEIR PREPARATION, AND MOLDED ARTICLES MADE FROM THESE COPOLYAMIDES, THEIR BLENDS OR ALLOYS

FIELD OF THE INVENTION

The subject of the present invention is colorless, transparent copolyamides based on cycloaliphatic diamines and aromatic dicarboxylic acids, their blends or alloys with homopolyamides, and the molding articles that can be produced from them.

BACKGROUND

In German Patent Disclosure DE 2 642 244, copolyamides of cycloaliphatic diamines substituted, isophthalic acid, which can also contain 50% terephthalic acid, and 30 to 40 weight % of lactams, ω-aminocarboxylic acids or combinations of long-chain dicarboxylic acids and diamines having from 5 to 12 carbon atoms are described. With such a high proportion—30 to 40%—of additional monomers, glass transition temperatures ($T_G$) of about 170° are the best that can be attained, yet they do not make for the very high values of heat distortion under temperature needed for selected applications in equipment ma-nufacture and in sterilizable molded articles for use in medicine or with foodstuffs.

European Patent Disclosure EP 313 436 describes similar monomer combinations for transparent polyamides, in which the proportion of terephthalic acid can exceed that of isophthalic acid by 100% and more. The proportion of lactam or ω-aminocarboxylic acid or of combinations of aliphatic diamines and aliphatic dicarboxylic acids in polyamide is thus greater than 20% and preferably greater than 30%. These polyamides again have a TG no higher than 160° C., which precludes applications in the higher temperature range. U.S. Pat. No. 4,898,896 and European Disclosures EP 0 553 581 and EP 0 550 308 describe copolyamides of alkyl- substituted bis-(4-aminocylohexyl)alkanes with isophthalic and terephthalic acid and high proportions of lactam as monomers, which once again, because of the overly numerous C6 monomer units, have unsatisfactorly low $T_g$ values.

SUMMARY

The object of this invention is accordingly to address the lack of copolyamides for molded articles on the basis of cycloaliphatic diamines and aromatic dicarboxylic acids which are not only transparent but also colorless, and which have glass transition temperatures (Tg) of more than 175° C. and preferably more than 195° C. and high heat distortion under temperature, without losing rigidity, strength, high tenacity and good chemical resistance.

This object is attained by the colorless, transparent copolyamides on the basis of cycloaliphatic diamines and aromatic dicarboxylic acids characterized by being made up of a) at least one cycloaliphatic diamine having from 6 to 24 carbon atoms in substantially equimolar proportion with b) at least one aromatic dicarboxylic acid having from 8 to 16 carbon atoms and c) up to 20 mol % of further polyamide-forming monomers, in particular from 1 to 19 mol % of at least one lactam or ω-aminocarboxylic acid, or of the substantially equimolar mixture of at least one aliphatic diamine and at least one aliphatic dicarboxylic acid which have from 6 to 12 carbon atoms, wherein the copolyamides have a glass transition temperature of more than 175° C., and by blends or alloys of the copolyamides with at least one homopolyamide, wherein the copolyamides or their blends or alloys optionally contain processing- and/or usage-dictated additives.

This object has been attained in particular by copolyamides in which the cycloaliphatic diamine has from 15 to 21 carbon atoms and at least one cyclohexane ring and is singly or multiply substituted, in particular on the at least one ring and/or on the methylene group between two rings, by the substitution of methyl, ethyl or propyl groups. This object is also attained by the molded articles that can be made from the copolyamides, their blends or alloys with homopolyamides, and by a process for preparing the copolyamides.

DETAILED DESCRIPTION

It has been found that in particular colorless, transparent, amorphous copolyamides with glass transition temperatures above 175° C. can be prepared from cycloaliphatic diamines (a) such as bis-(3-methyl-4-aminocyclohexyl)methane (such as Laromin $C_{260}{}^R$, BASF) or bis-(4-aminocyclohexyl) methane or bis-(4-aminocyclohexyl)-2,2'- dimethylpropane, combined with aromatic dicarboxylic acids (b) having from 8 to 16 carbon atoms and selectively further polyamide-forming monomers (c). The at least one aromatic dicarboxylic acid is preferably isophthalic acid, which can be replaced, up to a maximum of 50 mol %, by terephthalic acid or other aromatic dicarboxylic acids, such as naphthalene dicarboxylic acid or mixtures thereof, and/or by a maximum of 20 mol % of aliphatic dicarboxylic acids. The further polyamide-forming monomers (c) are preferably lactams or ω-aminocarboxylic acids or combinations of aliphatic diamines with aliphatic dicarboxylic acids which each have from 6 to 12 carbon atoms, with the proportion of monomers being a maximum of 20 mol %.

With a glass transition temperature of over 175° C., in particular over 185° C. and very particularly between 195° and 230° C., the copolyamides according to the invention can be used in high-temperature applications or for sterilizable molded articles. Copolyamides with glass transition temperatures above 197° C. have proven to be especially good.

In particular embodiments of the copolyamides of the invention, the lactam is decanolactam and/or dedecanolactam, whose proportion is a maximum of 20 mol % and in particular is between 1 and 19 mol %.

The invention is also embodied by blends or alloys of the copolyamides according to the invention with further homopolyamides selected from the group comprising PA12, PA11, PA6, PA612, PA610, PA69 and PA66, preferably in amounts of up to 30 weight %.

The copolyamides or their mixtures or blends advantageously contain additives selected from the group comprising chain regulators, lubricants, heat and UV stabilizers, dyes, pigments, and reinforcing agents selected from the group comprising glass, minerals and organic fibers.

The invention also relates to the molded articles that can be made from the colorless, transparent copolyamides, or their blends or alloys with homopolyamides, preferably selected from the group comprising PA12, PA11, PA6, PA612, PA610, PA69 and PA66, and which selectively contain processing- and/or usage-dictated additives, especially comprising chain regulators, lubricants, heat and UV stabilizers, dyes, pigments, and reinforcing agents.

The invention moreover relates to a process for preparing the colorless, transparent copolyamides.

The polycondensation process of these raw materials can be performed in one or more partial steps; first, the cycloaliphatic diamine can be made to react with the aromatic acid in the form of a salt, and the lactam is jointly condensated in a second step, or else in an autoclave, all three types of monomers are polycondensed and subsequently condensated in solid stage to higher viscosities in a degassing extruder, or else all three types of monomers are polycondensed in one step to relatively high viscosity in a high-pressure autoclave or are produced with the aid of at least two reaction extruders, where the polymer discharge is accomplished with a feed screw. The reaction temperatures employed are from 280° to 320° C. The monomers are typically homogeneously mixed in a receiving container; often, such chain regulators as benzoic acid, ethyl hexanoic acid, stearic acid and such phosphorous-containing catalysts as $H_3PO_3$, $H_3PO_2$, phosphates or organic phosphorous compounds, and such salts as acetates or chlorides are added.

Diamines and dicarboxylic acids are often used only in a virtually equimolar proportion, in order to compensate for losses or to attain certain final group concentrations.

The molded articles from the copolyamides described are distinguished in having high tenacity, high strength and rigidity, good stress cracking resistance in hot water and organic solvents, good alternate bending stability and melt stability. The higher viscosities that are readily attainable are no problem for modern processing machines, such as injection molding machines or blow forming extruders, and are desired in the industry.

The polyamides according to the invention will be described in further detail in the following examples:

EXAMPLE 1

Via a dissolving vessel with a 200 l capacity, 7.0 kg of laurin lactam, 11.6 kg of isophthalic acid, 17.0 kg of bis-(3-methyl-4-aminocyclohexyl)methane in the form of Laromin $C_{260}{}^R$, 120 g of benzoic acid, 10 g of $H_3PO_3$, 250 g of Irganox 245 emulsion, and 10 l water, after intensive mixing at 80° C., are placed in a 130 l autoclave. After a heating phase up to 160° C., a pressure phase of 3 h at 285° C. and 18 bar and a decompressing and degassing phase of approximately 2 to 3 h at 280° C., it was possible by means of a heated pump as the discharge device to draw off a transparent strand of polyamide that after cooling was granulated by means of a water bath at a temperature up to 40° C. The dried granulate, approximately 32 kg in weight, had the following physical properties:

| eta rel. (0.5%, m-cresol) | | 1.45 |
|---|---|---|
| terminal groups NH₂/COOH | (μ equiv/g) | 115/115 |
| Tg (DSC) | (°C.) | 192 |
| melt viscosity at 270° C. /12.6 N | (Pa · s) | 6680 |
| H₂O content | (%) | <0.005 |

The DIN test specimens produced from the granulate by injection molding at the following mechanical properties:

| impact strength 23° C., dry per DIN 53453 | (kJ/m²) | 100 |
|---|---|---|
| notched impact strength 23° C., dry per DIN 53453 | (kJ/m²) | 2.5 |
| tensile strength at yield 23° C., dry/conditioned, per DIN 53455 | (N/mm²) | 94/83 |
| elongation at yield 23° C., dry/conditioned, per DIN 53455 | (%) | 8/6 |
| tensile strength at break 23° C., dry/conditioned, per DIN 53455 | (N/mm²) | 81/73 |
| elongation at break 23° C., dry/conditioned | (%) | 5/11 |
| tensile E-Modulus 23° C., dry/conditioned per DIN 53457 | (N/mm²) | 2420/2570 |
| heat distortion temperature HDT A/B dry, per DIN 53461/ISO 75 | (°C.) | 130/143 |
| HDT A/B conditioned, per DIN 53461/ISO 75 | (°C.) | 124/149 |

EXAMPLE 2

Similarly to Example 1, after homogenization at 80° C. in a dissolving vessel, the following raw materials were placed in a 130 l autoclave:

| 6.0 kg | laurin lactam |
|---|---|
| 20.45 kg | bis-(3-methyl-4-aminocyclohexyl)methane |
| 13.95 kg | isophthalic acid |
| 160 g | benzoic acid |
| 50 g | magnesium stearate |
| 5 kg | water |
| 12 g | H₃PO₂ (50% concentration) |

After a compression phase and decompression and degassing phase, by drawing off a strand, a polyamide composition approximately 35 kg in weight was drawn off and granulated; it had the following properties:

| eta rel. (0.5%, m-cresol) | | 1.433 |
|---|---|---|
| terminal groups NH₂/COOH | (μ equiv/g) | 79/35 |
| Tg (DSC) | (°C.) | 203 |
| melt viscosity at 270° C./122.6 N | (Pa · s) | 16,107 |
| H₂O content | (%) | 0.005 |
| The polymer injection molded to make test specimens had the following mechanical values: | | |
| impact strength 23° C., dry per DIN 53453 | (kJ/m²) | nb |
| notched impact strength 23° C., dry per DIN 53453 | (kJ/m²) | 3.1 |
| tensile E-modulus 23° C., dry, per DIN 53452 | (N/mm²) | 2420 |
| bending stress at break 23° C., dry, per DIN 53452 | (N/mm²) | 143 |
| tensile,strength at break 23° C., dry, per DIN 53455 | (N/mm²) | 70 |
| elongation at break 23° C., dry | (%) | 23 |

EXAMPLE 3

A comparable batch to Example 1 was polycondensed in the 130 l autoclave, and the following raw materials by weight were used for this:

| 6.5 kg | laurin lactam |
|---|---|
| 17 kg | bis-(3-methyl-4-aminocyclohexyl)methane |
| 11.6 kg | isophthalic acid |

-continued

| 175 g | benzoic acid |
| 0.05 g | $H_3PO_3$ |
| 10 l | water |

The granulate prepared from this had a solution viscosity eta rel. (0.5% m-cresol) of 1.422 and a melt viscosity of 1414 Pa * s at 270° C./122.6 N.

The Tg was 201° C. Small DIN bars of it had an impact strength "nb" (for "no break") and a notch impact strength of 1.0 KJ/m$^2$; the E-modulus, dry, was 2860 N/mm$^2$. Alternateending strengths of 40,000 cycles were measured in a C. Schenk alternate bending apparatus (flexural fatigue test per DIN 53442).

The batch was condensated at approximately 290° C. in a reaction extruder ZSK30 with two vacuum zones. The condensated polyamide underwent a major increase in solid stage viscosity and tenacity to rel eta 1.522 (0.5% m-cresol) at a melt viscosity (270° C./122.6 N) of 3316 Pa * s.

The following mechanical properties were measured for test specimens made from this:

| impact strength 23° C., dry | (kJ/m$^2$) | nb |
| notched impact strength 23° C., dry | (kJ/m$^2$) | 4.6 |
| tensile strength at yield 23° C., dry/conditioned | (N/mm$^2$) | 92/81 |
| elongation at yield 23° C., dry/conditioned | (%) | 8/7 |
| tensile strength at break 23° C., dry/conditioned | (N/mm$^2$) | 98/60 |
| elongation at break 23° C., dry/conditioned | (%) | 18/20 |
| tensile E-modulus 23° C., dry/conditioned | (N/mm$^2$) | 2620/2830 |
| alternate bending strength, dry | (cycles) | 116,000 |

EXAMPLE 4

198 kg of laurin lactam, 510.2 kg of bis-(3-methyl-4-aminocyclohexyl)methane, 282 kg of isophthalic acid, 4.8 kg of benzoic acid, 0.26 kg of $H_3PO_2$ were polycondensed in 350 kg of soft water in an autoclave with a capacity of 2 metric tons. The resultant dried granulate in the amount of approximately 880 kg had a solution viscosity eta rel. of 1.46 (0.5%, in m-cresol), a melt viscosity (270° C./122.6 N) of 15.28 Pa * s, terminal groups $NH_2$/COOH (m equiv/g) of 61/66, and a Tg of 197.4° C.

Small DIN bars made from this had a notched impact strength at 23° C. of 3.8 KJ/m$^2$. Following condensation in solid stage in a WPF degassing extruder ZSK 58, rel eta values of 1.66 were attained, and small DIN bars made from the granulate had a notched impact strength of 5.2 KJ/m$^2$.

I claim:

1. A colorless, transparent copolyamide or blend or alloy thereof with at least one homopolyamide, characterized in that the copolyamide is made up substantially of
    a) at least one cycloaliphatic diamine having from 6 to 24 carbon atoms in substantially equimolar proportion with
    b) at least one aromatic dicarboxylic acid having from 8 to 16 carbon atoms and
    c) up to 1 to 19 mol% of at least one further polyamide-forming monomer, of at least one lactam or ω-aminocarboxylic acid,
wherein the copolyamide has a glass transition temperature $T_G$ of more than 175° C., and the copolyamide or blend or alloy thereof optionally contains additives.

2. A colorless, transparent copolyamide, or a blend or alloy thereof with at least one homopolyamide, said transparent copolyamide being made up substantially of
    (a) a cycloaliphatic diamine consisting essentially of bis-(3-methyl-4-aminocyclohexyl) methane,
    (b) a substantially equimolar proportion with said diamine of a mixture of isophthalic acid with up to 50 mol% based on the total amount of dicarboxylic acid, of terephthalic acid, and
    (c) 1–19 mol % of at least one further polyamide-forming monomer of at least one lactam or omega-aminocarboxylic acid,
wherein the copolyamide has a glass transition temperature $T_G$ of more than 175° C.

3. The copolyamide of claim 1, characterized in that the glass transition temperature is above 185° C.

4. The copolyamide of claim 3, characterized in that the glass transition temperature is between 195° and 230° C.

5. The copolyamide of claim 1, characterized in that the aromatic dicarboxylic acid is isophthalic acid, which is replaced by a maximum of 50 mol % terephthalic acid and/or naphthalene dicarboxylic acid.

6. The copolyamides of claim 5, characterized in that the diamine has from 15 to 21 carbon atoms and at least one cyclohexane ring.

7. The copolyamides of claim 6, characterized in that the diamine is singly or multiply substituted by methyl, ethyl or propyl groups at the at least one ring and/or at the methylene group between two rings.

8. The copolyamide of claim 7, characterized in that the substituted cycloaliphatic diamine is a bis-(3-methyl-4-aminocyclohexyl)methane.

9. The copolyamide of claim 2, characterized in that the lactam is decanolactam or dodecanolactam.

10. The copolyamide of claim 9, characterized in that in a blend or in an alloy the least one homopolyamide is selected from the group consisting of PA12, PA11, PA6, PA612, PA610, PA69 and PA66, which is contained in proportions of up to 30 weight %.

11. The copolyamide of claim 10, characterized in that at least one said optional additive is present and is selected from the group consisting of chain regulators, lubricants, heat and UV stabilizers, dyes, pigments and reinforcing agents selected from the group consisting of glass, minerals and organic fibers.

12. A molded article, produced from a colorless, transparent copolyamide or blend or alloy of claim 11.

13. A process for preparing colorless, transparent copolyamide of claim 1, characterized in that
    the monomers are polycondensed and subsequently condensated in solid stage to higher viscosities in a degassing extruder.

14. The copolyamides of claim 1 characterized in that the glass transition temperature is between 195° and 230° C.

15. The copolyamides of claim 1, characterized in that the diamine has from 15 to 21 carbon atoms and at least one cyclohexane ring.

16. The copolyamides of claim 2, characterized in that the diamine is singly or multiply substituted by methyl, ethyl, or propyl groups at the at least one ring and/or at the methylene group between two rings.

17. The copolyamides of claim 8, characterized in that the lactam is decanolactam or dodecanolactam.

18. The copolyamides of claim 2, characterized in that the lactam is decanolactam or dodecanolactam.

19. The copolyamide of claim 2, characterized in that in a blend or in an alloy the least one homopolyamide is selected from the group consisting of PA12, PA11, PA6, PA612, PA610, PA69 and PA66, which is contained in proportion of up to 30 weight %.

20. The copolyamide of claim 2, characterized in that at least one said optional additive is present and is selected from the group consisting of chain regulators, lubricants, heat and UV stabilizers, dyes, pigments and reinforcing agents selected from the group consisting of glass, minerals and organic fibers.

21. A molded article, produced from a colorless, transparent copolyamide or blend or alloy of claim 2.

* * * * *

UNITED STATES PATENT AND TRADEMARK OFFICE
CERTIFICATE OF CORRECTION

PATENT NO. : 5,684,120
DATED : Nov. 4, 1997
INVENTOR(S) : Hans DALLA TORRE

It is certified that error appears in the above-indentified patent and that said Letters Patent is hereby corrected as shown below:

Cover page, line [75], delete "Phil Hans Dallas Torre" and insert therefor --Hans DALLA TORRE--.

Signed and Sealed this

Ninth Day of June, 1998

Attest:

BRUCE LEHMAN

Attesting Officer

Commissioner of Patents and Trademarks